(12) United States Patent
Iguma (10) Patent No.: US 10,605,195 B2
(45) Date of Patent: Mar. 31, 2020

(54) MANUFACTURING METHOD FOR ENGINE

(71) Applicant: TOYOTA JIDOSHA KABUSHIKI KAISHA, Toyota-shi, Aichi-ken (JP)

(72) Inventor: Hiroki Iguma, Sunto-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 95 days.

(21) Appl. No.: 15/860,918

(22) Filed: Jan. 3, 2018

(65) Prior Publication Data

US 2018/0252179 A1   Sep. 6, 2018

(30) Foreign Application Priority Data

Mar. 3, 2017   (JP) ................. 2017-040295

(51) Int. Cl.
| | | |
|---|---|---|
| F02F 1/24 | (2006.01) | |
| F02B 77/11 | (2006.01) | |
| F16J 10/02 | (2006.01) | |
| B23P 13/02 | (2006.01) | |

(52) U.S. Cl.
CPC ............... *F02F 1/24* (2013.01); *F02B 77/11* (2013.01); *B23P 13/02* (2013.01); *F02F 2200/00* (2013.01); *F02F 2200/06* (2013.01); *F16J 10/02* (2013.01)

(58) Field of Classification Search
CPC ...... F02F 1/24; F02F 2200/00; F02F 2200/06; F02F 3/00; F02F 3/28; F02F 3/26; F02B 77/11; F16J 10/02; F16J 1/00; B23P 13/02; B23P 15/10
See application file for complete search history.

(56) References Cited

U.S. PATENT DOCUMENTS

| | | | | |
|---|---|---|---|---|
| 4,559,684 A | | 12/1985 | Pryor | |
| 2011/0296684 A1* | | 12/2011 | Yamamoto | B23P 13/02 29/888.06 |
| 2015/0275819 A1* | | 10/2015 | Nishikawa | F02F 1/24 29/888.06 |
| 2017/0022938 A1* | | 1/2017 | Fujimoto | F02M 25/03 |
| 2018/0057954 A1* | | 3/2018 | Yamashita | C25D 11/246 |

(Continued)

FOREIGN PATENT DOCUMENTS

| | | |
|---|---|---|
| DE | 10 2016 008 912 A1 | 1/2017 |
| JP | H01-147680 A | 6/1989 |
| JP | 2011-256730 | 12/2011 |

(Continued)

OTHER PUBLICATIONS

English translation of JP2016173087 (Year: 2016).*
English translation of JP2004035303 (Year: 2004).*

*Primary Examiner* — Jun S Yoo
(74) *Attorney, Agent, or Firm* — Finnegan, Henderson, Farabow, Garrett & Dunner, LLP (57) ABSTRACT

A cylinder head material of an engine is casted (Step S1). Next, the cylinder head material is machined (Step S2). Next, a heat shielding film is formed on a ceiling surface of the cylinder head material (Step S3). Next, the film thickness of the heat shielding film is measured (Step S4). Next, a rank of a piston to be combined with the ceiling surface is selected (Step S5). The rank of the piston selected in Step S5 is a rank according to depth of a cavity. Next, the rank of the piston selected in Step S5 is stamped on the cylinder head (Step S6).

6 Claims, 5 Drawing Sheets

(56) References Cited

U.S. PATENT DOCUMENTS

2018/0106211 A1    4/2018  Iguma
2018/0106212 A1*   4/2018  Iguma .................... B23C 3/055

FOREIGN PATENT DOCUMENTS

| JP | 2014-156790 A | 8/2014 |
| JP | 2015-183640   | 10/2015 |
| JP | 2016-173087 A | 9/2016 |
| JP | 2017-82703    | 5/2017 |
| JP | 2018-066316 A | 4/2018 |
| JP | 2018-066318 A | 4/2018 |

* cited by examiner

MANUFACTURING METHOD FOR ENGINE

CROSS-REFERENCE TO RELATED APPLICATION

The present disclosure claims priority under 35 U.S.C. § 119 to Japanese Patent Applications No. 2017-40295, filed on Mar. 3, 2017. The contents of these applications are incorporated herein by reference in their entirety.

TECHNICAL FIELD

The present disclosure relates to a manufacturing method for an engine. More specifically, the present disclosure relates to a manufacturing method for an engine comprising a cylinder head.

BACKGROUND

JP 2011-256730 A discloses a manufacturing method for an engine. The method comprising the steps of; casting a cylinder head material having a recessed portion which forms a part of a combustion chamber, cutting a matching surface of the cylinder head material with a cylinder brook, measuring the distance in the height direction from a reference surface on a top portion of the recessed portion to the matching surface, and adjusting a cutting amount of the surface of the recessed portion based on the distance in the height direction. When the distance in the height direction is measured, an error with respect to the standard of the volume of the combustion chamber can be calculated. Therefore, according to the method mentioned above, the volume of the combustion chamber can be kept within a specified range.

Meanwhile, in order to improve a performance of an engine, a heat shielding film may be formed on a ceiling surface of the combustion chamber such as the surface of the recessed portion. When such heat shielding film is formed on the ceiling surface, it is possible to improve a performance of suppressing heat (i.e. heat shielding performance) generated in the combustion chamber from radiating to outside via the ceiling surface. In this case, however, the volume of the combustion chamber is decreased in accordance with that of the heat shielding film. However, forming the heat shielding film on the ceiling surface is equivalent to forming the heat shielding film after the cutting step of the ceiling surface is completed. Therefore, it is practically difficult to cut the ceiling surface after the heat shielding film is formed.

Instead of cutting the ceiling surface, a surface of the heat shielding film may be cut after the heat shielding film is formed. However, the film thickness of the heat shielding film has a high correlation with the heat shielding performance mentioned above. Therefore, when it is not enough to cut the surface of the heat insulating film and when the thickness of the film is highly reduced by adjusting the cutting amount of the heat insulating film based on the distance in the height direction, there is a possibility that a desired heat shielding performance of the film cannot be exhibited.

The present disclosure addresses the above problem, and an object of the present disclosure is to provide a manufacturing method of an engine capable of avoiding unnecessary cutting work of a surface of a heat insulating film which is formed on a ceiling surface of a combustion chamber within a surface of a cylinder head, and keeping a volume of the combustion chamber within a specified range.

SUMMARY

A first aspect of the present disclosure is a manufacturing method of an engine comprising the steps of:
preparing a cylinder head having a surface on which a ceiling surface of a combustion chamber;
forming a heat shielding film on the ceiling surface;
measuring a volume of the heat shielding film; and
selecting out of multiple ranks of pistons one rank to be combined with the ceiling surface, wherein each of the pistons includes a cavity, the multiple ranks are preset in accordance with volume of the cavity,
wherein the selecting step is a step to select the one rank of which volume of the cavity corresponds to a divergence amount of the measured volume of the heat shielding film from a design volume.

A second aspect of the present disclosure is a manufacturing method of an engine according to the first aspect,
wherein the manufacturing method further comprising the step of stamping information of the selected one rank on the surface of the cylinder head.

A third aspect of the present disclosure is a manufacturing method of an engine according to the first or the second aspect,
wherein the selecting step is a step to select the one rank of which volume of the cavity minimizes the divergence amount.

A fourth aspect of the present disclosure is a manufacturing method of an engine according to any one of the first to third aspects,
wherein the forming step is a step to form a heat shielding film having a porous structure on the ceiling surface.

A fifth aspect of the present disclosure is a manufacturing method of an engine according to any one of the first to fourth aspects,
wherein the cavity is formed in each top land of the pistons as an annular groove surrounding a conical protrusion,
the multiple ranks are preset in accordance with depth of the cavity from an upper end of the top land to a lower end of the annular groove.

According to the first aspect, one rank is selected out of the multiple ranks preset in accordance with the volume of the cavity. Since the cavity volume of the selected one rank corresponds to the divergence amount of the heat shielding film, even when the measured volume of the heat shielding film deviates from the design volume, it is possible to reduce the divergence amount of the measured volume by the cavity volume of the selected one rank. Therefore, the volume of the combustion chamber can be kept within the specified range while avoiding unnecessary cutting work of the surface of the heat shielding film.

According to the second aspect, information of the selected one rank is stamped on the surface of the cylinder head. Therefore, it is possible to keep the volume of the combustion chamber within the specified range upon actual assembly of an engine. Further, it is possible to prevent the volume of the combustion chamber from changing upon replacement of the piston with a new one.

According to the third aspect, one rank of which volume of the cavity minimizes the divergence amount is selected. Therefore, the deviation of the measured volume can be offset by the cavity volume of the selected one rank and thus, the volume of the combustion chamber can be kept within the specified range.

According to the fourth aspect, it is possible to manufacture an engine capable of exhibiting high heat shielding performance by the heat shielding film with the porous structure.

According to the fifth aspect, it is possible to select the one rank corresponding to the divergence amount out of the multiple ranks preset in accordance with the depth of the cavity.

DESCRIPTION OF EMBODIMENT

Hereinafter, an embodiment of the present disclosure is described based on the drawings. It is to be noted that common elements in each figure are designated by the same reference numerals, and duplicated description thereof are omitted herein. It is also to be noted that the following embodiment do not limit the present disclosure.

Figure 1:
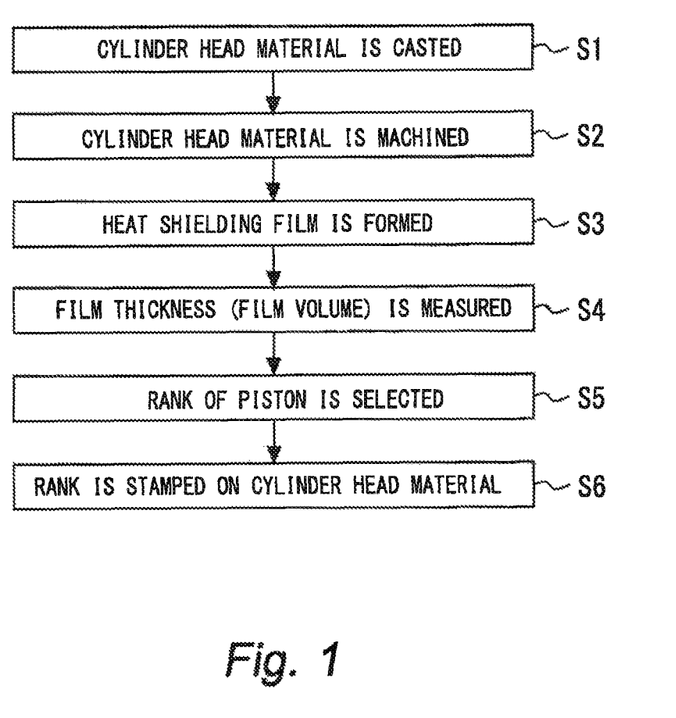
FIG. 1 is a flowchart illustrating a manufacturing method of an engine according to an embodiment of the present disclosure.

FIG. 1 is a flowchart illustrating a manufacturing method of an engine according to an embodiment of the present disclosure. As illustrated in FIG. 1, in the manufacturing method of the present embodiment, at first, a cylinder head material of an engine (more specifically, a compressed self-ignition engine) is casted (Step S1). The cylinder head material has a ceiling surface of a combustion chamber on its surface. The combustion chamber is defined as a surrounded space by a bore surface of a cylinder block with which a cylinder head manufactured by the manufacturing method is combined, a top surface of a piston stored inside the bore surface, a bottom surface of the cylinder head, bottom surfaces of umbrella parts of an intake valve and an exhaust valve which are disposed at the cylinder head.

The cylinder head material comprises at least an intake port at which the intake valve is disposed and an exhaust port at which the exhaust valve is disposed. In Step S1, for example, a plurality of cores for forming the intake port and the exhaust port are disposed inside a mold. Then, a molten aluminum alloy is poured into the mold. After solidification of the molten aluminum, the cylinder head material is obtained by removing from the mold. Since such casting method is Well known as disclosed, for example in JP 2000-356165 A, further explanation will be omitted.

Following Step S1, the cylinder head material is machined (Step S2). In Step S2, a hole for mounting a valve guide for supporting stem portions of the intake valve or the exhaust valve, and a seta ring for seating the umbrella portions of these valves are formed by drilling. In Step S2, further, a hole for inserting a positioning pin used in Step S4, a hole for fastening the cylinder head material to the cylinder block, an oil passage for flowing a lubricating oil, and the like are drilled. In Step S2, further, cutting work is performed on an inner surface of the intake port and the exhaust port formed at Step S1. After these processes, the valve guides and the seat rings are inserted into the corresponding holes by press fitting, shrink fitting, or cold fitting.

Following Step S2, a heat shielding film is formed on the surface of the cylinder head material (that is, a ceiling surface of the combustion chamber) (Step S3). In Step S3, the heat shielding film is formed as follows. First, nickel-chromium-based ceramic particles are thermally sprayed on the entire ceiling surface. Next, zirconia particles are thermally sprayed on the entire surface of the nickel-chromium-based film. According to such two-step thermal spraying, a sprayed film comprising an intermediate layer composing of nickel-chromium and a surface layer composing of zirconia can be formed as the heat shielding film. This sprayed film has a porous structure derived from internal bubbles formed in the process of thermal spraying. Therefore, this sprayed film functions as a heat shielding film having lower thermal conductivity and volume heat capacity than cylinder head material. The thermal spraying method is not particularly limited, and various methods such as flame spraying, high-speed flame spraying, arc spraying, plasma spraying, laser spraying and the like may be adopted.

In Step 3, instead of nickel-chromium-based ceramic particles and zirconia particles, ceramic particles such as silicon nitride, yttria, titanium oxide and the like, or composite ceramic particles such as cermet, mullite, cordierite, steatite and the like may be appropriately combined and thermal sprayed. In Step S3, further, an anodic oxidation film, may be formed on the ceiling surface. Or, a coating film of a heat shielding paint including hollow particles may be formed on the ceiling surface. Or an inorganic silica film having pores may be formed with a blowing agent. These films have a porous structure like the thermal sprayed film and function as a heat shielding film with lower thermal conductivity and volume heat capacity than the cylinder head material. In addition, a coating film of a heat shielding paint without the hollow particles or the inorganic silica having less pores may be formed on the ceiling surface. Although these films do not have the porous structure like the thermal sprayed film, both of these films can function like the heat shielding film with lower thermal conductivity and volume heat capacity than the cylinder head material.

In Step S3, a film thickness of the heat shielding film formed on the ceiling surface is adjusted in a range of 50 to 200 μm in accordance with a target thermal properties (that is, thermal conductivity and volume heat capacity). In some cases, fine irregularities originating in the porous structure are generated on the surface of the heat shielding film. Therefore, when adjusting the film thickness of the heat shielding film, it is desirable to polish the surface of the heat shielding film for the purpose of smoothing the surface. However, an excessive polishing may lead to damage to the heat shielding film due to the structure of the heat shielding film. Therefore, it is desirable to keep it within the necessary minimum range even in a case of polishing for smoothing.

Figure 2:
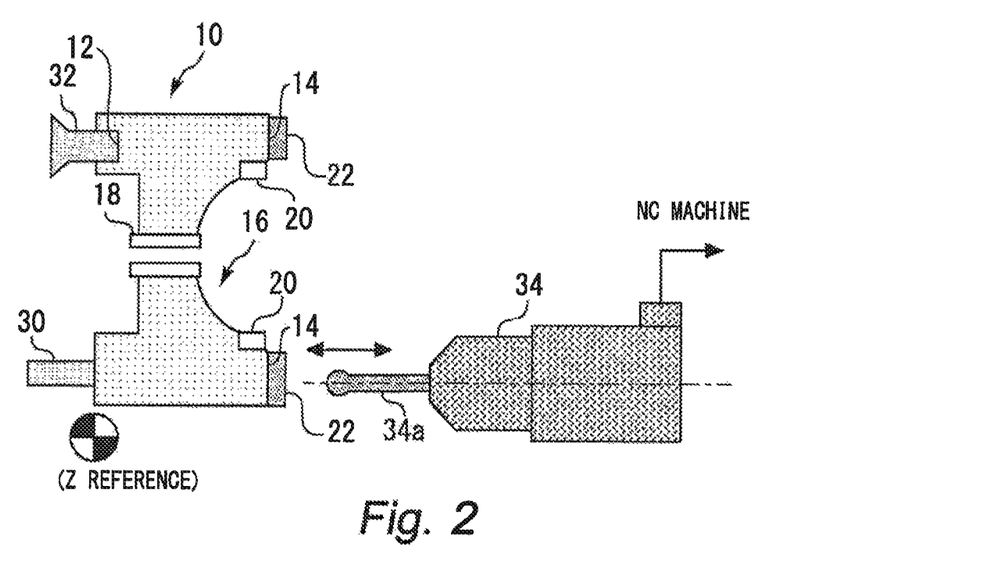
FIG. 2 is a view for explaining an example of a film thickness measurement method of a heat shielding film in Step S4 of FIG. 1.
Figure 3:
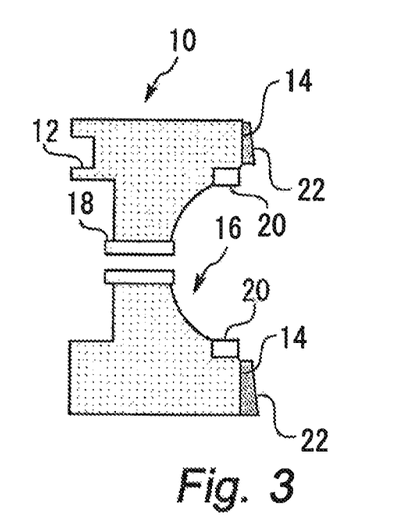
FIG. 3 is a view for explaining an example in which the heat shielding film is inclined with respect to a ceiling surface of a combustion chamber.

Following Step S3, the film thickness of the heat shielding film is measured (Step S4). FIG. 2 is a view for explaining an example of a film thickness measurement method of the heat shielding film in Step S4 of FIG. 1. As illustrated in FIG. 2, a cylinder head material 10 has a hole 12. The hole 12 is formed in Step S2 mentioned above. Into the hole 12, a positioning pin 32 of a processing stage 30 for coordinating X and Y reference is inserted. Thereby the cylinder head material 10 is fixed to the reference position (Z reference) of the processing stage 30.

In FIG. 2, a part of the ceiling surface 14 of the cylinder head material 10 is illustrated. In FIG. 2, only one port 16 (the intake port or the exhaust port) of the cylinder head material 10 is illustrated. A seat ring 18 illustrated in Step S2 is inserted into an opening portion of the port 16 positioned on the ceiling surface 14 side. A valve guide 20 illustrated in Step S3 is inserted into a hole with which the port 16 communicates. A heat shielding film illustrated in Step S3 is formed on the ceiling surface 14.

The heat shielding film 22 faces a coordinate measuring unit 34 mounted on an NC (Numerical Control) machine. When the coordinate measuring unit 34 is moved to a vicinity of the heat shield film 22, a coordinate in the thickness direction of the heat shielding film 22 is measured. The measured value of the coordinate is output to a controller of the NC machine and recorded. The measurement of the coordinate in the thickness direction is desirably performed at a plurality of positions of the heat shielding film 22. This is because that the heat shielding film 22 sometimes inclines with respect to the ceiling surface. In this respect, when the measurement of the coordinate is performed at a plurality of positions and an average of the measured value is calculated, the thickness of the heat shielding film 22 can be obtained more accurately.

In Step S4, instead of using the coordinate measuring unit 34 shown in FIG. 2, a laser displacement meter, step measurement using a line laser light, an eddy current type film thickness meter may be used to measure the film thickness of the heat shielding film 22.

Returning to FIG. 1, the description of the manufacturing method will be continued. Following Step S4, a rank of a piston to be combined with the ceiling surface is selected (Step S5). In Step S5, for example, a volume of the heat shielding firm is calculated based on the thickness of the heat shielding film measured in Step S4 and a formation area of the heat shielding film. When the heat shielding film has the porous structure mentioned above, the volume is calculated as an entire film volume including the internal pores. Since a region where the heat shielding film is formed in Step S3 is known from its design stage, it is not necessary to measure the formation area. For example, when the heat shielding film is formed on the entire ceiling surface, the formation area is estimated to equal to the surface area of the ceiling surface. However, when the calculation of the volume of the heat shielding film is to be accurate, the formation area may be calculated by measuring the coordinates of the heat shielding film with the coordinate measuring unit 34 illustrated in FIG. 2.

Figure 4:
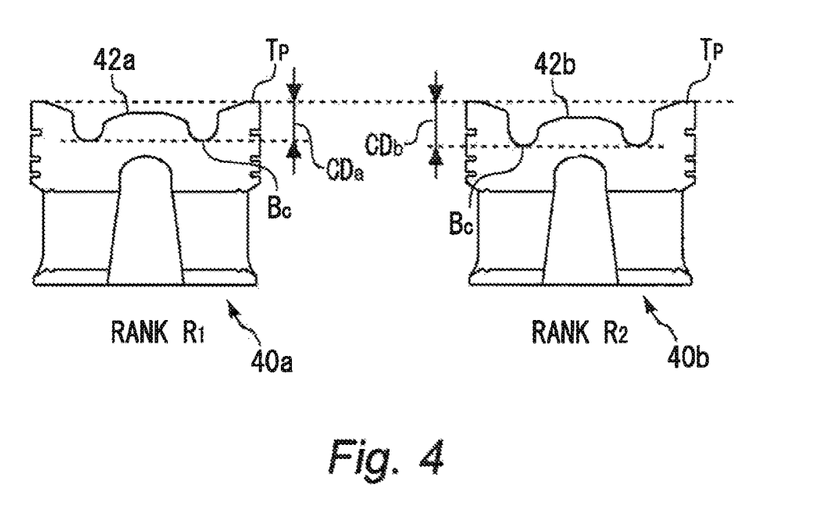
FIG. 4 is a view illustrating an example of two kinds of pistons being different from each other only in depth of a cavity.

The rank of the piston selected in Step S5 is a rank according to depth of a cavity. FIG. 4 is a view illustrating an example of two kinds of pistons being different from each other only in depth of a cavity. A pistons 40a and 40b illustrated in FIG. 4 have cavities 42a and 42b, respectively. The cavity 42a or 42b is formed as an annular groove having a substantially arcuate cross section surrounding a conical protrusion. A bottom surface of the cavity 42a (or the cavity 42b) constitutes a wall surface of the combustion chamber together with a top surface of the piston 40a (or the piston 40b). A distance from an upper end TP of a top land of the piston to a lower end BC of the annular groove means a depth CD of the cavity. Comparing the depths of the cavities 42a and 42b, the depth of the cavity 42b (depth CDb) is deeper than that of the cavity 42a (depth CDa). Then, for example, the piston 40a is classified as a rank R1, while the piston 40b is classified as a rank R2.

Note that the two ranks R1 and R2 are illustrated as the ranks of the piston, but needless to say, the rank number of the piston to be selected in Step S5 can be set to 3 or more. The multiple pistons of different depth CD can be prepared, for example, by cutting work of multiple annular grooves belonging to a reference rank.

Figure 5:
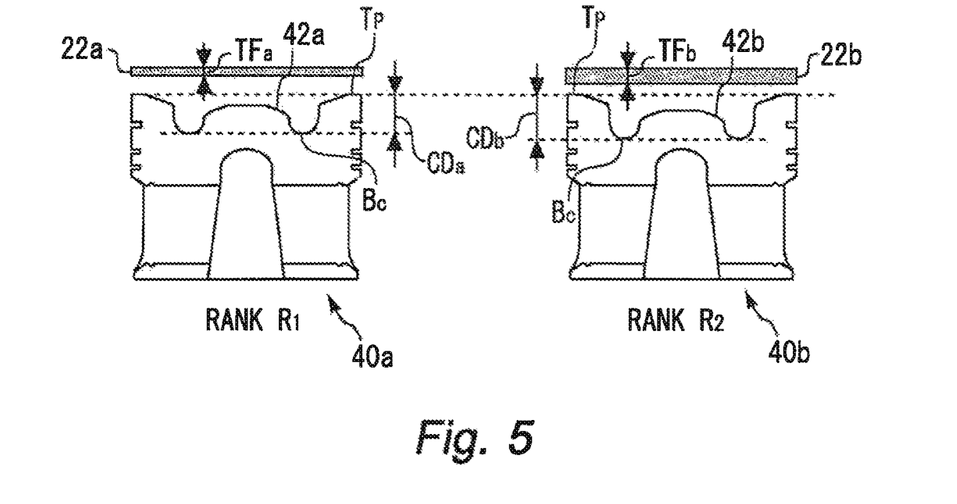
FIG. 5 is a diagram schematically illustrating two examples of engines in which two kinds of heat shielding film being different from each other in thickness are combined with the two kinds of the pistons.

In step S5, for example, a rank of a piston is selected so as to minimize a divergence amount between the volume of the heat shielding film calculated in the same step and a design value. The design value is set in advance as a volume of the heat shielding film to be formed on the ceiling surface in consideration of the film thickness to be adjusted and the film formation area. FIG. 5 is a diagram schematically illustrating two examples of engines in which two kinds of heat shielding film being different from each other in thickness are combined with the two kinds of pistons. In FIG. 5, pistons at the top dead center and heat shielding films are illustrated, while a cylinder housing the piston and a ceiling surface on which the heat shielding film is formed are omitted.

When comparing the film thickness TF of the heat shielding films 22a and 22b shown in FIG. 5, the film thickness TFb of the heat shielding film 22b is thicker than the film thickness TFa of the heat shielding film 22a. Therefore, for example, the heat shielding film 22a is combined with the piston 40a having the rank R1 with a shallower depth CDa. Further, for example, the heat shielding film 22b is combined with the piston 40b having the rank R2 with larger depth CDb. Then, each volume of the combustion chambers of the two types of engines shown in FIG. 5 can be within a specified range.

Returning to FIG. 1, the description of the manufacturing method will be continued. Following Step S5, the rank of the piston selected in Step S5 is stamped on the cylinder head (Step S6). The selected rank stamped on the surface of the cylinder head visible from outside as information indicating the rank of the piston to be combined with the ceiling surface. This stamp processing is carried out, for example, by embossing a sign or engraving with laser processing. However, QR code (registered trademark) may be used in place of the sign. Instead of the sign, identification by position or number of cutouts may be used. By stamping such information, it is possible to select an appropriate piston to be combined with the ceiling surface not only when assembling the engine but also when disassembling the engine to replace the piston with a new one.

As mentioned above, according to the manufacturing method of the present embodiment, it is possible to determine the appropriate rank of the piston to be combined with the ceiling surface. Therefore, when the engine is assembled, the volume of the combustion chamber can be kept within the specified range. Further, according to the manufacturing of the present embodiment, the rank of the appropriate piston can be stamped to the cylinder head. Therefore, it is possible to prevent the volume of the combustion chamber from deviating from the specified range when replacing the piston with a new one as well as assembling the engine.

In the above embodiment, Steps S1 and S2 of FIG. 1 correspond to the "preparing step" of the first aspect, Step S3 of FIG. 1 corresponds to the "forming step" of the same aspect, Step S4 of FIG. 1 corresponds to "measurement step" of the same aspect, and Step S5 of FIG. 1 corresponds to the "selection step" of the same aspect.

Further, in the above embodiment, Step S6 of FIG. 1 corresponds to the "stamping step" of the second aspect.

Figure 6:
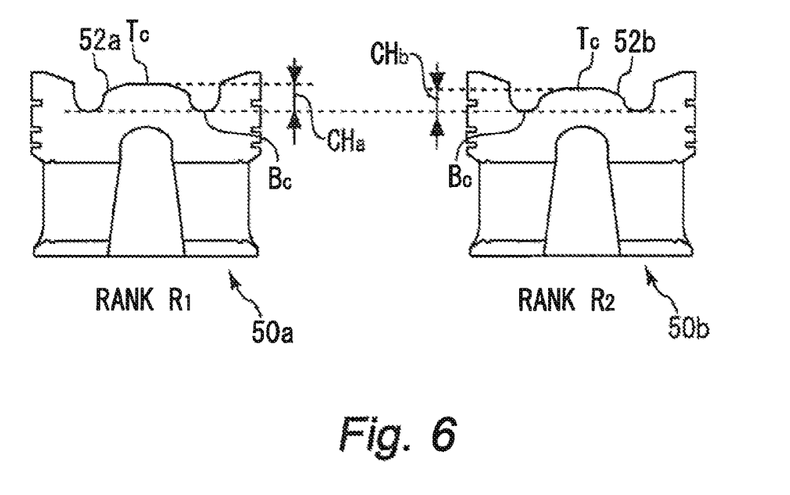
FIG. 6 is a view illustrating an example of two kinds of the pistons being different each other only in cavity height.

Incidentally, in the above embodiment, the rank of the piston is preset based on the depth CD of the cavity. However, instead of the depth CD, the rank of the piston may be preset based on a height of the cavity. FIG. 6 is a view illustrating an example of two kinds of pistons different from each other only in cavity height. Pistons 50a and 50b shown in FIG. 6 have cavities 52a and 52b, respectively. The height CH of the cavity means a distance from the deepest portion Bc of the annular groove to the top Tc of the protrusion. Comparing the heights of the cavities 52a and 52b, the height CHb of the cavity 52b is lower than the height CHa of the cavity 52a. Then, for example, the piston 50a is classified as the rank R1, while the piston 50b is classified as the rank R2.

Figure 7:
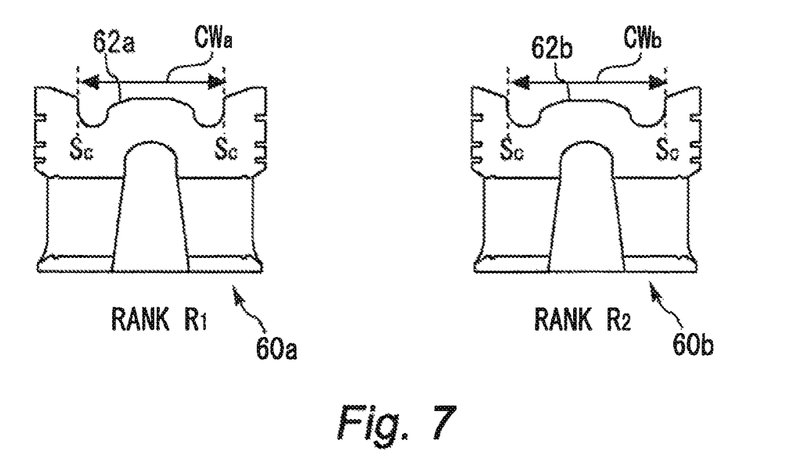
FIG. 7 is a view illustrating an example of two kinds of the pistons being different each other only in cavity width.

Furthermore, instead of the depth CD of the cavity, the rank of the piston may be preset based on a width of the cavity in the direction of the piston top surface. FIG. 7 is a view illustrating an example of two types of pistons different from each other only in cavity width. Pistons 60a and 60b shown in FIG. 7 have cavities 62a and 62b, respectively. The width CW of the cavity means a distance between two side surfaces Sc of the annular groove. Comparing the width CW of the cavities 62a and 62b, the width CWb of the cavity 62b is larger than the width CWa of the cavity 62a. Then, for example, the piston 60a is classified as the rank R1, while the piston 60b is classified as the rank R2.

Furthermore, the rank of the piston may be preset by arbitrarily combining the depth CD, the height CH, and the width CW of the cavity. That is, the preset method of the piston rank can be combined with various modifications for changing the volume of the cavity. From the viewpoint of minimizing the influence on combustion state in the combustion chamber, it is preferable to preset the rank of the piston based on the depth CD of the cavity as explained in the above embodiment.

Figure 8:
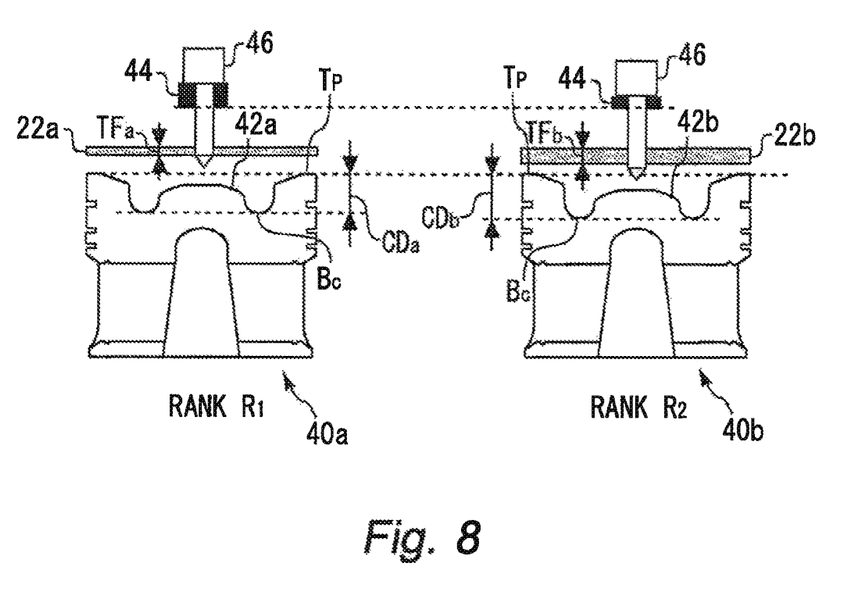
FIG. 8 is a diagram in which an injector is added to each of the two types of engines illustrated in FIG. 5.

When a piston other than the piston belonging to the reference rank is selected in Step S5, a shape of the cavity of the selected piston would be differ from that of the piston belonging to the reference rank. Then, when such piston other than the piston belonging to the reference rank is installed in the engine, a shape of fuel spray in the cavity may become an unintended shape. In order to avoid such a problem, when incorporating the piston other than the piston belonging to the reference rank into the engine, it is desirable to adjust an axial thickness of a sheet-like gasket of an injector. FIG. 8 is a diagram in which an injector is added to each of the two types of engines illustrated in FIG. 5. As illustrated in FIG. 8, when incorporating the piston 40a in the engine, a thinner gasket 44 is adopted as compared with a case where the piston 40b is incorporated in the engine. By such an adjustment, a distance between a tip portion of the injector 46 and the annular groove can be kept within a specified range.

In the above embodiment, the rank of the piston is selected so as to minimize the divergence amount from the design value. However, even if the piston has a rank that is different from the rank that minimizes the divergence amount, when the piston belonging to a rank that can eventually contain the volume of the combustion chamber within the specified range (for example, a rank that makes the divergence amount the second smallest), such rank can be selected instead of the rank that minimizes the divergence amount. In other words, when a piston belonging to a rank corresponds to the divergence amount, it can be selected instead of the piston belonging to the rank that minimizes the divergence amount.

What is claimed is:

1. A manufacturing method of an engine comprising the steps of:
   preparing a cylinder head having a surface including a ceiling surface of a combustion chamber;
   forming a heat shielding film on the ceiling surface;
   measuring a volume of the heat shielding film;
   selecting out of multiple ranks of pistons one rank to be combined with the ceiling surface, wherein each of the pistons includes a cavity, the multiple ranks are preset in accordance with volume of the cavity; and
   stamping information of the selected one rank on the surface of the cylinder head,
   wherein the selecting step is a step to select the one rank of which volume of the cavity corresponds to a divergence amount of the measured volume of the heat shielding film from a design volume.

2. The manufacturing method of an engine according to claim 1,
   wherein the selecting step is a step to select the one rank of which volume of the cavity minimizes the divergence amount.

3. The manufacturing method of an engine according to claim 1,
   wherein the forming step is a step to form a heat shielding film having a porous structure on the ceiling surface.

4. A manufacturing method of an engine comprising the steps of:
   preparing a cylinder head having a surface including a ceiling surface of a combustion chamber;
   forming a heat shielding film on the ceiling surface;
   measuring a volume of the heat shielding film; and
   selecting out of multiple ranks of pistons one rank to be combined with the ceiling surface, wherein each of the pistons includes a cavity, the multiple ranks are preset in accordance with volume of the cavity,
   wherein the selecting step is a step to select the one rank of which volume of the cavity corresponds to a divergence amount of the measured volume of the heat shielding film from a design volume,
   wherein the cavity is formed in each top land of the pistons as an annular groove surrounding a conical protrusion,
   the multiple ranks are preset in accordance with at least one of each depth of the cavity from an upper end of the top land to a lower end of the annular groove, each height of the cavity from a deepest portion of the annular groove to a top of the protrusion, or each width of the cavity between two side surfaces of the annular groove.

5. The manufacturing method of an engine according to claim 4,
   wherein the selecting step is a step to select the one rank of which volume of the cavity minimizes the divergence amount.

6. The manufacturing method of an engine according to claim 4, wherein the forming step is a step to form a heat shielding film having a porous structure on the ceiling surface.

* * * * *